(12) United States Patent
Pathuvoth et al.

(10) Patent No.: US 12,012,927 B2
(45) Date of Patent: Jun. 18, 2024

(54) SYSTEM AND METHOD FOR DETECTING A FAILURE CONDITION IN A COMPONENT OF A WIND TURBINE

(71) Applicant: General Electric Renovables Espana, S.L., Barcelona (ES)

(72) Inventors: Dhanesh Chandrashekar Pathuvoth, Bengaluru (IN); Vidyashankar Ramasastry Buravalla, Bengaluru (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/752,166

(22) Filed: May 24, 2022

(65) Prior Publication Data

US 2023/0383730 A1    Nov. 30, 2023

(51) Int. Cl.
*F03D 17/00*    (2016.01)
*F03D 7/02*    (2006.01)
(Continued)

(52) U.S. Cl.
CPC .......... *F03D 17/00* (2016.05); *F03D 7/0264* (2013.01); *G01N 3/34* (2013.01); *G01N 29/045* (2013.01); *F05B 2260/80* (2013.01); *F05B 2270/334* (2013.01); *F05B 2270/807* (2013.01); *F05B 2270/808* (2013.01); *F05B 2270/821* (2013.01)

(58) Field of Classification Search
CPC ... G01N 3/32–38; G01N 29/045; G01M 7/08; F03D 17/00; F03D 7/0264
See application file for complete search history.

(56) References Cited

U.S. PATENT DOCUMENTS

| | | | | |
|---|---|---|---|---|
| 4,164,149 A | * | 8/1979 | Okubo | G01H 11/00 73/594 |
| 5,533,399 A | * | 7/1996 | Gibson | G01N 29/12 73/659 |

(Continued)

FOREIGN PATENT DOCUMENTS

| CN | 211668764 U | 10/2020 |
|---|---|---|
| CN | 113217302 A | 8/2021 |

(Continued)

OTHER PUBLICATIONS

Impact Solenoids, Olson Instruments, Nondestructive Testing & Evaluation Equipment, 4 Pages. Retrieved Mar. 8, 2022 from webpage https://olsoninstruments.com/impact-devices/.

(Continued)

*Primary Examiner* — Topaz L. Elliott
(74) *Attorney, Agent, or Firm* — Dority & Manning, P.A.

(57) ABSTRACT

A method for detecting a failure condition in one or more components of a wind turbine is provided. The method includes actuating, via a controller, an impact device to generate a vibration having a vibration frequency and a vibration magnitude in the one or more components. The (Continued)

method further includes receiving data indicative of the vibration frequency and the vibration magnitude from a sensor communicatively coupled to the controller. The method further includes determining, via the controller, whether the data indicative of the vibration frequency and/or the vibration magnitude is outside of a predetermined vibration range for the one or more components.

15 Claims, 6 Drawing Sheets

(51) Int. Cl.
    *G01N 3/34*     (2006.01)
    *G01N 29/04*     (2006.01)

(56) References Cited

U.S. PATENT DOCUMENTS

| | | | |
|---|---|---|---|
| 8,630,813 B2 * | 1/2014 | Piazza | G01N 29/46 |
| | | | 702/35 |
| 9,488,620 B2 * | 11/2016 | Adams | G01N 19/04 |
| 10,399,707 B2 * | 9/2019 | Belk | H02N 10/00 |
| 2009/0142178 A1 * | 6/2009 | Nieuwenhuizen | F03D 13/22 |
| | | | 415/2.1 |
| 2011/0218744 A1 * | 9/2011 | Piazza | G01N 29/045 |
| | | | 702/56 |
| 2013/0195657 A1 * | 8/2013 | Lauritsen | F01D 25/00 |
| | | | 416/61 |
| 2014/0003939 A1 * | 1/2014 | Adams | F03D 7/0224 |
| | | | 416/1 |
| 2014/0047922 A1 * | 2/2014 | Adams | G01M 7/025 |
| | | | 73/865.6 |
| 2017/0260968 A1 * | 9/2017 | Tsutsui | F03D 17/00 |
| 2018/0162556 A1 * | 6/2018 | Belk | C06B 33/00 |
| 2019/0391059 A1 * | 12/2019 | Miyake | G01N 3/34 |
| 2020/0332775 A1 * | 10/2020 | Nielsen | F03D 17/00 |
| 2021/0207576 A1 * | 7/2021 | Larsen | F03D 1/0675 |

FOREIGN PATENT DOCUMENTS

| | | | | |
|---|---|---|---|---|
| DE | 10065314 A1 | | 7/2002 | |
| DE | 102021002090 A1 * | | 10/2022 | F03D 17/00 |
| EP | 2626683 A1 * | | 8/2013 | F03D 17/00 |
| EP | 3392652 A1 | | 10/2018 | |
| EP | 4040119 A1 * | | 8/2022 | |
| GB | 2543114 A * | | 4/2017 | G01M 5/0025 |
| JP | 2011185632 A | | 9/2011 | |
| JP | 2013231409 A | | 11/2013 | |
| JP | 2016061634 A | | 4/2016 | |
| JP | 6185541 B2 * | | 8/2017 | |
| KR | 20130025530 A * | | 3/2013 | |
| KR | 20140012409 A * | | 2/2014 | |
| WO | WO-2016012372 A1 * | | 1/2016 | F03D 17/00 |
| WO | WO-2016101953 A1 * | | 6/2016 | |
| WO | WO-2022171350 A1 * | | 8/2022 | |

OTHER PUBLICATIONS

Kin et al., 2006-366: Natural Frequency Method (Impact Acoustic Method) for Crack Defect Evaluation in Steel Parts, American Society for Engineering Education, 2006, Pp. 11.953.1-11.953.10. https://peer.asee.org/natural-frequency-method-impact-acoustic-method-for-crack-defect-evaluation-in-steel-parts.pdf.
University of Texas, 3 Experiment Apparatus & Setup, 3.1 Impulse-Force Hammer Test, 12 Pages. Retrieved Mar. 9, 2022 from Webpage: http://www.ae.utexas.edu/courses/ase463q/design_pages/spring03/wavelet/Webpage/setup.htm.
European Search Report EP 23171310, Oct. 16, 2023.

* cited by examiner

SYSTEM AND METHOD FOR DETECTING A FAILURE CONDITION IN A COMPONENT OF A WIND TURBINE

FIELD

The present disclosure relates generally to detecting failure conditions in a wind turbine, more particularly, to systems and methods for detecting a failure condition in one or more components of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To properly orient the rotor blades relative to the direction of the wind, wind turbines typically include one or more pitch bearings, which may be housed in a hub connected to the nacelle. Such bearings are typically slewing bearings which are rotational ball bearings that support a heavy but slow-turning or slow-oscillating load. Typical pitch bearings include an outer and inner race with a plurality of ball bearings configured between the races. As such, pitch bearings permit rotation of the rotor blades and are mounted between the hub and one of the rotor blades.

The pitch bearings, the hub, and the rotor blades may each be exposed to large forces and/or stresses over the operational life of the wind turbine. As such, the pitch bearings, the hub, and/or the rotor blades may occasionally experience failure conditions in which fractures and/or cracks may form and propagate through the components. Such failure conditions may require a shut down of the wind turbine in order to perform maintenance, in order to prevent further damage to the machine, thereby negatively impacting wind farm efficiency.

In view of the foregoing, an improved system and method for detecting failure conditions in one or more components of a wind turbine is desirable and would be appreciated in the art.

BRIEF DESCRIPTION

Aspects and advantages of the invention will be set forth in part in the following description, or may be obvious from the description, or may be learned through practice of the invention.

In one aspect, the present disclosure is directed to a method for detecting a failure condition in one or more components of a wind turbine. The method includes actuating, via a controller, an impact device to generate a vibration having a vibration frequency and a vibration magnitude in the one or more components. The method further includes receiving data indicative of the vibration frequency and the vibration magnitude from a sensor communicatively coupled to the controller. The method further includes determining, via the controller, whether the data indicative of the vibration frequency and/or the vibration magnitude is outside of a predetermined vibration range for the one or more components. It should be understood that the method may further include any of the additional features and/or steps described herein.

In another aspect, the present disclosure is directed to a system for detecting a failure condition in one or more components of a wind turbine. The system includes an impact device that is disposed on one of the one or more components and is configured to selectively generate a vibration in the one or more components. The system further includes a sensor that is disposed on one of the one or more components and is configured to provide data indicative of vibrations in the one or more components. The system further includes at least one controller. The controller includes at least one processor configured to perform a plurality of operations. The plurality of operations include, but are not limited to, actuating the impact device to generate a vibration having a vibration frequency and a vibration magnitude in the one or more components, receiving, via the sensor, data indicative of the vibration frequency and the vibration magnitude, and determining whether the data indicative of the vibration frequency and/or the vibration magnitude is outside of a predetermined vibration range for the one or more components. It should be understood that the system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
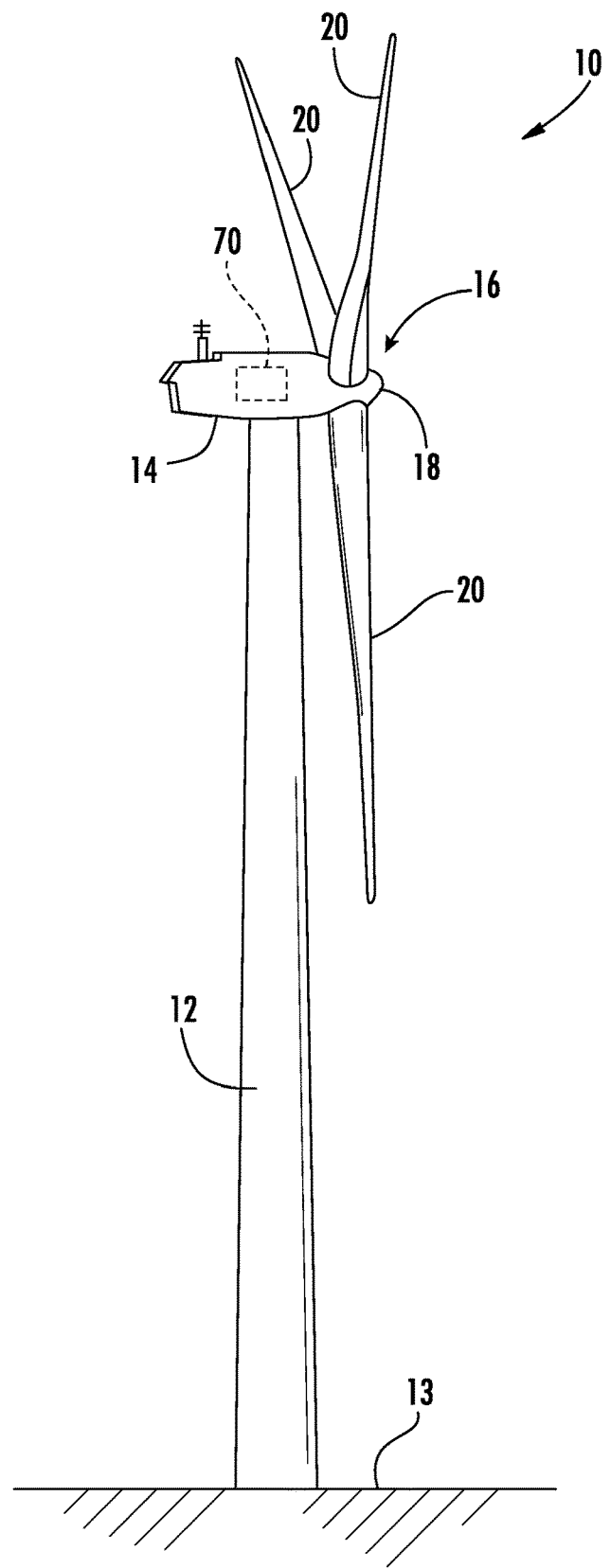
FIG. 1 illustrates a perspective view of a wind turbine in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 224 (FIG. 2) positioned within the nacelle 14 to permit electrical energy to be produced.

Figure 2:
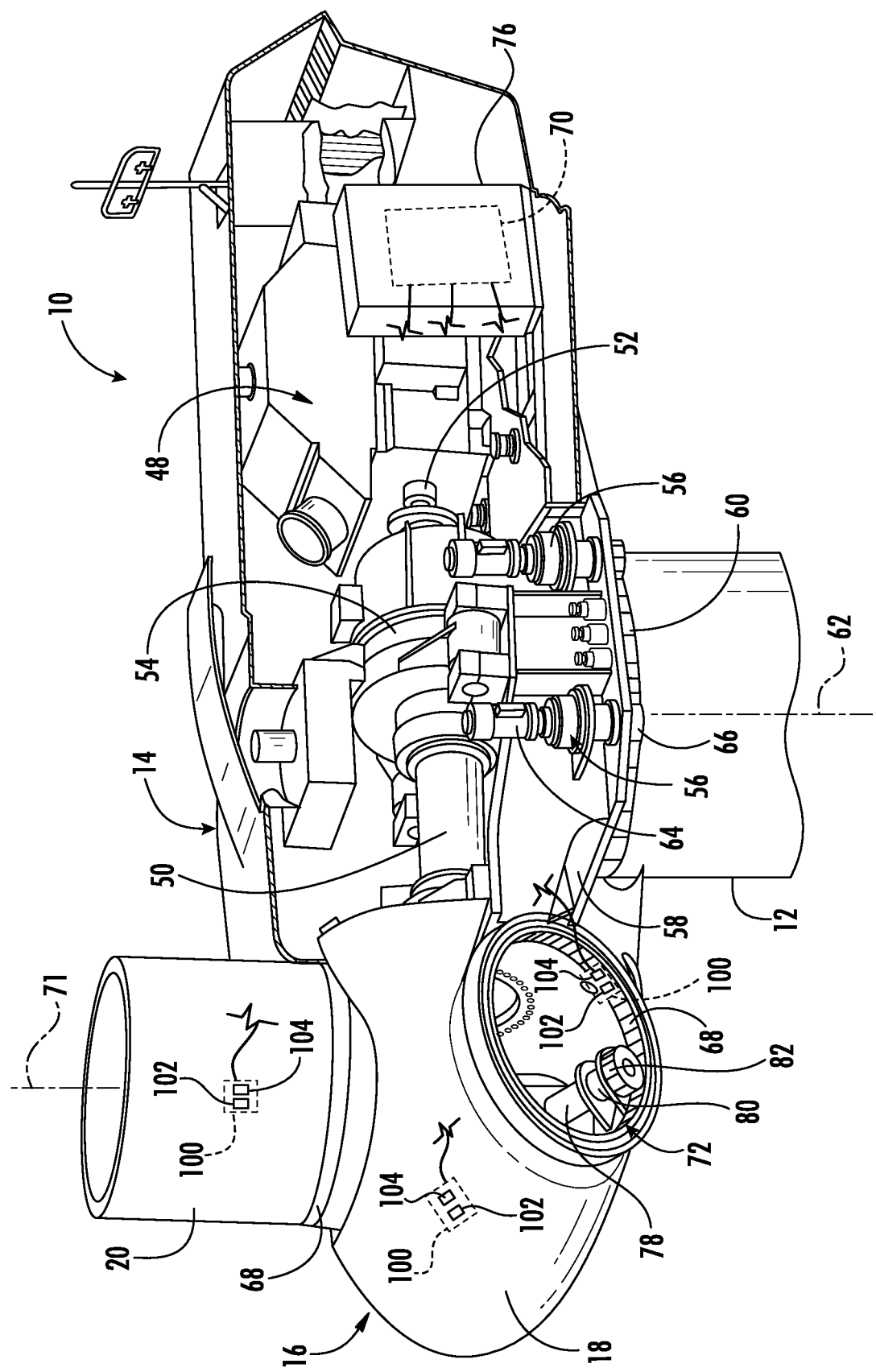
FIG. 2 illustrates a perspective, internal view of a nacelle of a wind turbine in accordance with embodiments of the present disclosure.

Referring now to FIG. 2, a simplified, internal view of one embodiment of the nacelle 14 of the wind turbine 10 shown in FIG. 1 is illustrated. As shown, a generator 48 may be disposed within the nacelle 14. In general, the generator 48 may be coupled to the rotor 16 of the wind turbine 10 for generating electrical power from the rotational energy generated by the rotor 16. For example, the rotor 16 may include a rotor shaft 50 coupled to the hub 18 for rotation therewith. The generator 48 may then be coupled to the rotor shaft 50 such that rotation of the rotor shaft 50 drives the generator 48. For instance, in the illustrated embodiment, the generator 48 includes a generator shaft 52 rotatably coupled to the rotor shaft 50 through a gearbox 54. However, in other embodiments, it should be appreciated that the generator shaft 52 may be rotatably coupled directly to the rotor shaft 50. Alternatively, the generator 48 may be directly rotatably coupled to the rotor shaft 50 (often referred to as a "direct-drive wind turbine").

Additionally, the wind turbine 10 may include one or more yaw drive mechanisms 56 mounted to and/or through a bedplate 58 positioned atop the wind turbine tower 12. Specifically, each yaw drive mechanism 56 may be mounted to and/or through the bedplate 58 so as to engage a yaw bearing 60 coupled between the bedplate 58 and the tower 12 of the wind turbine 10. The yaw bearing 60 may be mounted to the bedplate 58 such that, as the yaw bearing 60 rotates about a yaw axis 62 of the wind turbine 10, the bedplate 58 and, thus, the nacelle 14 are similarly rotated about the yaw axis.

In general, it should be appreciated that the yaw drive mechanisms 56 may have any suitable configuration and may include any suitable components known in the art that allow such mechanisms 56 to function as described herein. For example, as shown in FIG. 2, each yaw drive mechanism 56 may include a yaw motor 64 mounted to the bedplate 234. The yaw motor 64 may be coupled to a yaw gear 66 (e.g., a pinion gear) configured to engage the yaw bearing 60. For instance, the yaw motor 64 may be coupled to the yaw gear 66 directly (e.g., by an output shaft (not shown) extending through the bedplate 58) or indirectly through a suitable gear assembly coupled between the yaw motor 64 and the yaw gear 66. As such, the torque generated by the yaw motor 64 may be transmitted through the yaw gear 66 and applied to the yaw bearing 60 to permit the nacelle 14 to be rotated about the yaw axis 62 of the wind turbine 10. It should be appreciated that, although the illustrated wind turbine 10 is shown as including two yaw drive mechanisms 56, the wind turbine 10 may generally include any suitable number of yaw drive mechanisms 56. Similarly, it should be appreciated that the yaw bearing 60 may generally have any suitable configuration, including one or more of the bearing configurations described below.

Referring still to FIG. 2, the wind turbine 10 may also include a plurality of pitch bearings 68, with each pitch bearing 68 being coupled between the hub 18 and one of the rotor blades 20. As will be described below, the pitch bearings 68 may be configured to allow each rotor blade 20 to be rotated about its pitch axis 71 (e.g., via a pitch adjustment mechanism), thereby allowing the orientation of each blade 20 to be adjusted relative to the direction of the wind. It should be appreciated that, as used herein, the term "slewing bearing" may be used to refer to the yaw bearing 60 of the wind turbine 10 and/or one of the pitch bearings 68 of the wind turbine 10 or any other similar bearing.

As shown in FIGS. 1 and 2, the wind turbine 10 may also include a turbine control system or a turbine controller 70 within the nacelle 14. For example, as shown in FIG. 2, the turbine controller 70 may be disposed within a control cabinet 76 mounted to a portion of the nacelle 14. However, it should be appreciated that the turbine controller 70 may be disposed at any location on or in the wind turbine 10, at any location on the support surface 13 or generally at any other location. The turbine controller 70 may generally be configured to control the various operating modes (e.g., start-up or shut-down sequences) and/or components of the wind turbine 10.

Each rotor blade 20 may also include a pitch adjustment mechanism 72 configured to rotate each rotor blade 20 about a pitch axis 70. Further, each pitch adjustment mechanism 72 may include a pitch drive motor 78 (e.g., any suitable electric, hydraulic, or pneumatic motor), a pitch drive gearbox 80, and a pitch drive pinion 82. In such embodiments, the pitch drive motor 78 may be coupled to the pitch drive gearbox 80 so that the pitch drive motor 78 imparts mechanical force to the pitch drive gearbox 80. Similarly, the pitch drive gearbox 80 may be coupled to the pitch drive pinion 82 for rotation therewith. The pitch drive pinion 82 may, in turn, be in rotational engagement with a pitch bearing 68 coupled between the hub 18 and a corresponding rotor blade 20 such that rotation of the pitch drive pinion 82 causes rotation of the pitch bearing 68. Thus, in such embodiments, rotation of the pitch drive motor 78 drives the pitch drive gearbox 80 and the pitch drive pinion 82, thereby rotating the pitch bearing 68 and the rotor blade 20 about the pitch axis 70. Similarly, the wind turbine 10 may include one or more yaw drive mechanisms 56 communicatively coupled to the controller 70, with each yaw drive mechanism(s) 56 being configured to change the angle of the nacelle 14 relative to the wind (e.g., by engaging a yaw bearing 60 of the wind turbine 10).

Figure 3:
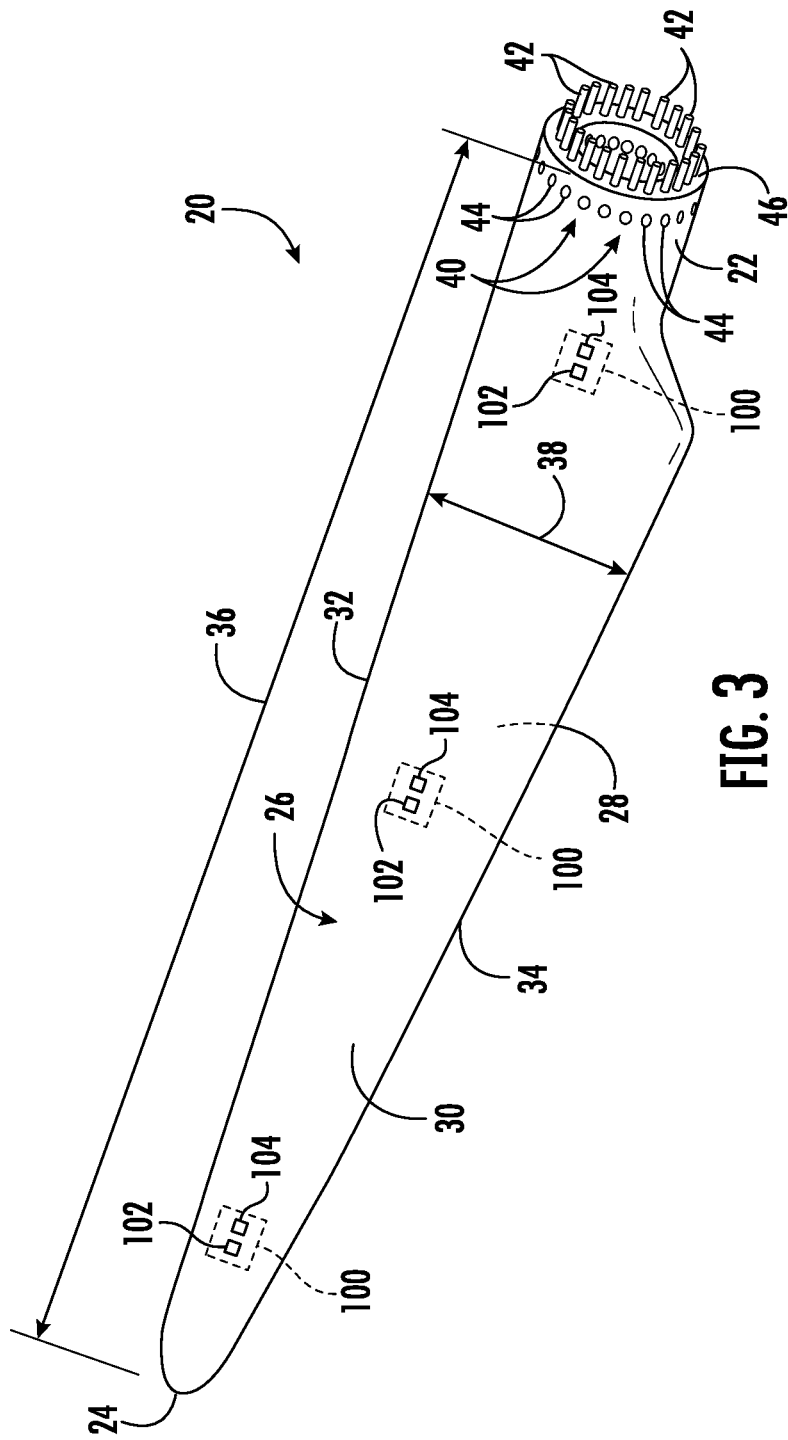
FIG. 3 illustrates a perspective view of a rotor blades of a wind turbine in accordance with embodiments of the present disclosure.

Referring now to FIG. 3, a perspective view of one of the rotor blades 20 shown in FIGS. 1 and 2 is illustrated in accordance with aspects of the present subject matter. As shown, the rotor blade 20 includes a blade root 22 configured for mounting the rotor blade 20 to the hub 18 of a wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. By projecting outwardly from the root end 46, the root bolts 44 may generally be used to couple the blade root 22 to the hub 18 (e.g., via one of the pitch bearings 68.

Figure 4:
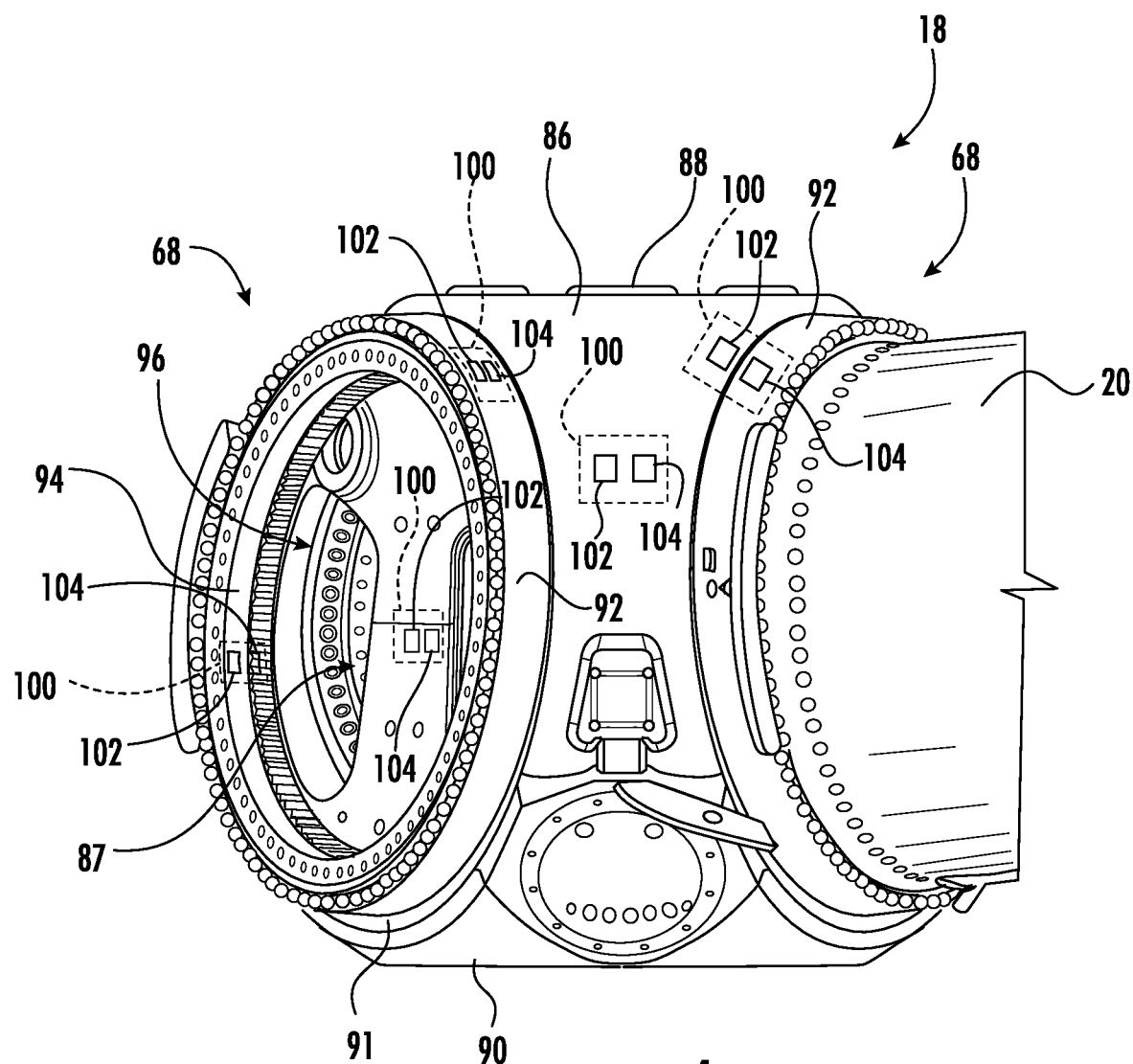
FIG. 4 illustrates a perspective view of a hub in accordance with embodiments of the present disclosure.

Referring now to FIG. 4, a perspective view of a hub 18 is illustrated in accordance with embodiments of the present disclosure. As shown, the hub 18 may have a hollow body 86 that defines and interior 87, which may be made of a suitable cast material. The hollow body 86 may include a first end 88 and a second end 90, in which the shaft (not shown) of the wind turbine 10 is mounted to the first end 88 of the hollow body 86.

Further, as shown, a plurality of pitch bearings 68 may be arranged at the outside of the hollow body 86. For example, each pitch bearing 68 may be mounted to the hollow body 86, and a corresponding rotor blade 20 may be mounted to the pitch bearing 68. Particularly, the pitch bearing 68 may include an outer race 92 and an inner race 94 (with a plurality of bearing members disposed between the outer race 92 and the inner race 94). The outer race 92 may be coupled to a flange 91 of the hollow body 86, and the inner race 94 may be coupled to the rotor blade 20. The outer race 92 and the inner race 94 may be rotatable relative to one another about the pitch axis 71 (FIG. 2). In various embodiments, each of the flanges 91 and corresponding pitch bearings 68 may be displaced from one another by about 120°. Moreover, each flange 91 may define an opening 96. A web (such as a stiffening web) may extend across the opening 96 defined by each flange 91.

Figure 5:
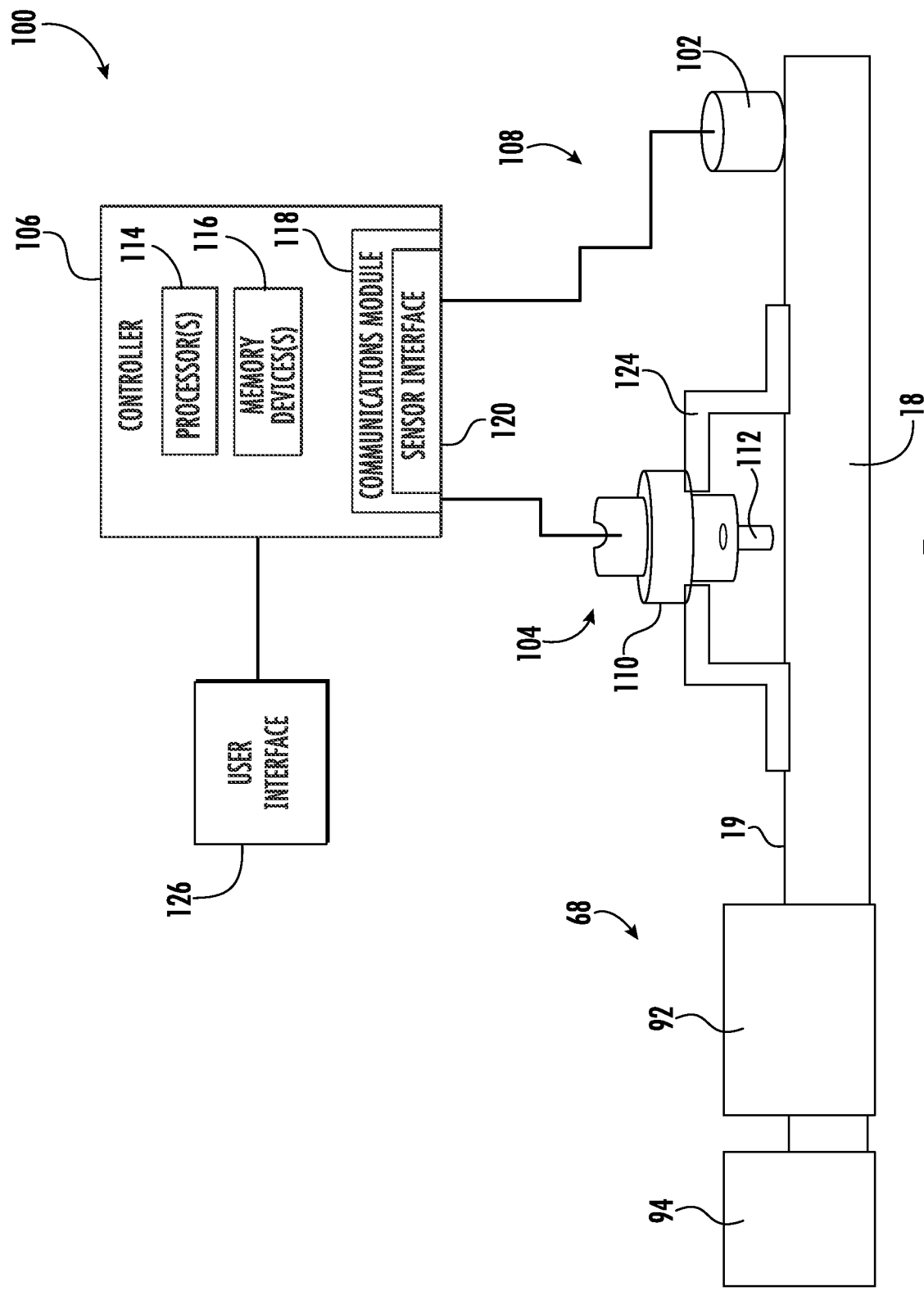
FIG. 5 illustrates a system for detecting a failure condition in one or more components of a wind turbine in accordance with embodiments of the present disclosure.

Referring generally to FIGS. 2-4, a system 100 may be disposed on one or more components of the wind turbine 10, in order to detect a failure condition (such as a crack, fracture, separation, or other failure condition) of the component to which the system 100 is attached. For example, as shown in FIG. 2, the system 100 may be disposed on the hub 18, the rotor blade 20, and/or the pitch bearing 68. The system 100 may be communicatively coupled to the turbine controller 70, or the system 100 may have a standalone controller (such as controller 106 as shown in FIG. 5) that may or may not be in communication with the turbine controller 70.

Furthermore, as shown, the system 100 may include a sensor 102 and an impact device 104 (such as an impactor). As will be described below in further detail below, the impact device 104 may be configured to impart a vibration in the component (e.g., by striking the component) to which the impact device 104 is attached, and the sensor 102 may be configured to measure data indicative of a frequency (and/or a wavelength) and a magnitude (and/or an amplitude) of the vibration. Stated otherwise, the impact device 104 may be configured to impart vibrations into the component (e.g., by striking the component) to which the impact device 104 is attached, and the sensor 102 may be configured to measure data indicative of a frequency and a magnitude of the vibrations in the component as a result the strike.

The system 100 may also provide the data indicative of the frequency (and/or the wavelength) and the magnitude (and/or the amplitude) of the vibration to the controller, thereby allowing the controller 70 to monitor a stiffness of the component. If the controller 70 detects a sudden change in stiffness of the component (e.g., due to a spike or increase in the frequency and/or magnitude of the vibrations in the component as a result of the impulse from the impact device), then the controller may identify that the component is experiencing a failure condition and initiate one or more control actions to prevent further component failure.

In another embodiment, as shown in FIG. 3, the system 100 (or one or more components of the system 100) may be disposed in one or more locations on the rotor blade 20, in order to detect a failure condition (such as a crack, fracture, separation, or other failure condition) of the rotor blade 20. For example, as shown in FIG. 3, the system 100 may be disposed on the body 26 of the rotor blade 20, such as on the pressure side 28 and/or the suction side 30. In some embodiments, the system 100 may be disposed closer to the blade tip 24 than the blade root 22. In other embodiments, the system 100 may be disposed closer to the blade root 22 than the blade tip 24.

In still another embodiment, as shown in FIG. 4, the system 100 (or one or more components of the system 100) may be disposed in one or more locations the hub 18 and/or the pitch bearing 68, in order to detect a failure condition (such as a crack, fracture, separation, or other failure condition) of the hub 18 and/or the pitch bearing 68. For example, as shown in FIG. 4, the system 100 may be disposed on the hollow body 86 of the hub 18. Particularly, the system 100 may be disposed in the interior 87 of the hollow body 86 of the hub 18, such that the system 100 is housed within the hub 18 and not exposed to ambient conditions (e.g., wind, rain, or other ambient conditions) during operation of the system 100 and/or the wind turbine 10. For example, the system 100 may be disposed on the flange 91, the web 98, and/or the hollow body 86 of the hub 18. In some embodiments, the system 100 may be disposed closer to the first end 88 than the second end 90. In other embodiments, the system 100 may be disposed closer to second end 90 than the first end 88.

In further embodiments, the system 100 may be disposed on the pitch bearing 68. For example, the system 100 may be disposed on one or both of the inner race 94 and/or the outer race 92 to detect a failure condition (e.g., a crack, fracture, separation, or other failure) in the pitch bearing 68 during operation of the wind turbine 10.

In yet further embodiments, as shown in FIG. 4, the impact device 104 and the sensor 102 of the system 100 may each be disposed on different components of the wind turbine 10. In such embodiments, the impact device 104 may strike a first component of the wind turbine on which the impact device 104 is disposed, thereby causing a vibration in the first component and neighboring components. The sensor may be disposed on a second component (which may directly neighbor the first component) of the wind turbine, in order to monitor the vibrations in the second component and/or the first component. For example, the impact device 104 may be disposed on the pitch bearing 68 (such as on the outer race 92 or the inner race 94) and the sensor 102 may be disposed on the hub 18 (such as on the hollow body 86 or in the interior 87). Alternatively, or additionally, the sensor 102 may be disposed on the pitch bearing 68 (such as on the outer race 92 or the inner race 94) and the impact device 104 may be disposed on the hub 18 (such as on the hollow body 86 or in the interior 87). As such, it should be appreciated that the impact device 104 and the sensor 102 may be disposed on the same component of the wind turbine 10 or different components of the wind turbine 10.

Referring now to FIG. 5, a system 100 of for detecting a failure condition in one or more components of a wind turbine 10. As used herein, a failure condition generally refers to a fracture, crack, separation, break in the one or more components to which the system 100 (or particular components of the system 100) is attached. In an embodiment, the failure condition may be a crack (e.g., a separation in the material from stress or other factors) in the one or more components of the wind turbine 10. As should be appreciated, a material crack in the one or more components of the wind turbine 10 may cause a change in the stiffness of the one or more components.

Furthermore, as mentioned, the system 100 may include at least one sensor 102, the impact device 104, and the controller 106. Each component of the system 100 may be disposed on one or more components 108 of the wind turbine 10. For example, as shown in FIG. 5, the sensor(s) 102 and the impact device 104 may each be disposed on the hub 18 (specifically on an interior surface 19 of the hub 18). However, as discussed above with reference to FIGS. 2 through 4, it should be appreciated that the sensor(s) 102 and the impact device 104 may be disposed on any component of the wind turbine 10 to detect a failure in the component to which the sensor 102 and the impact device 104 are attached. In exemplary implementations, the sensor(s) 102 and the impact device 104 may be attached to the same component of the wind turbine 10 (e.g., both coupled to the hub 18, the rotor blade 20, or the pitch bearing 68).

The impact device 104 may be disposed on the one or more components 108 and configured to selectively generate an impulse in the one or more components 108. For example, the impact device 104 may be a solenoid operated impact device (or solenoid impact device), impulse hammer, or other impact device that may selectively impact or strike the one or more components 108, thereby imparting an impulse in the one or more components 108. In response to the impulse, the one or more components 108 may vibrate (or oscillate). In particular embodiments, the impact device 104 may include a housing 110 (which may house an electric motor) and a piston rod 112 extending from the housing 110. In such embodiments, the piston rod 112 may be movable relative to the housing 110 to strike the component(s) 108.

The sensor 102 may be disposed on the component(s) 108 and configured to provide data indicative of vibrations in the component(s) 108. The data indicative of vibrations may include the vibration frequency and the vibration magnitude in one or more components, which may be measured after (or during) the striking event by the impact device 104 to monitor a stiffness of the component(s) 108.

The sensor(s) 102 may be provided on the wind turbine 10. As shown, the sensor(s) 102 may be disposed on the hub 18, and the sensor(s) 102 may be in communication with the controller 106. The sensor(s) 102 may monitor and provide information related to vibrations experienced by the hub 18 to the controller 108. For example, in many embodiments, the sensor(s) 102 may be a vibration sensor that monitors and sends acceleration signals to the controller 106 to indicate a vibration frequency and/or magnitude of the component to which the sensor 102 is attached.

In various embodiments, the sensor(s) 102 may be one of an accelerometer, a strain gauge, an eddy-current sensor, a laser displacement sensor, a gyroscope, or an acoustic pressure sensor, or other suitable sensor. In further embodiments, the sensor(s) 102 may be an accelerometer that monitors the acceleration forces of the component/object to which the accelerometer is attached. Thus, the sensor(s) 102 may provide the controller 106, via signals, with data indicative of a vibration experienced by the component to which the sensor(s) 102 is attached. Particularly, the sensor(s) 102 may provide the controller 106 with data indicative of a frequency and a magnitude of vibrations experienced by the component to which the sensor(s) 102 is attached.

It should also be appreciated that, as used herein, the term "monitor" and variations thereof indicates that the various sensors of the wind turbine 10 may be configured to provide a direct measurement of the parameters being monitored and/or an indirect measurement of such parameters.

Still referring to FIG. 5, the controller 106 is shown as a block diagram to illustrate the suitable components that may be included within the controller 106. As shown, the controller 106 may include one or more processor(s) 114 and associated memory device(s) 116 configured to perform a variety of computer-implemented functions (e.g., performing the methods, steps, calculations and the like and storing relevant data as disclosed herein). Additionally, the controller 106 may also include a communications module 118 to facilitate communications between the controller 106 and the various components of the system 100. For example, the communications module 118 may be in communication with the impact device 104, in order to allow the processor 114 to selectively actuate the impact device 104. Further, the communications module may include a sensor interface 120 (e.g., one or more analog-to-digital converters) to permit signals transmitted from one or more sensor 102 to be converted into signals that can be understood and processed by the processors 114. It should be appreciated that the sensor 102 may be communicatively coupled to the communications module 118 using any suitable means. For example, as shown in FIG. 5, the sensor 102 may be coupled to the sensor interface 120 via a wired connection. However, in other embodiments, the sensor 102 may be coupled to the sensor interface 120 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 106 to perform various functions and/or operations including, but not limited to, actuating the impact device 104 to strike the one or more components 108 of the wind turbine 10 and/or implement a control action in response to receiving data from the sensor 102.

In many embodiments, a distance may be defined between the sensor 102 and the impact device 104 (e.g., a linear distance, which may be measured along the interior surface 19 of the hub 18). Such distance is important because, if the sensor 102 is too far from the impact device 104, then the controller 106 may not be able to distinguish between vibrations caused by the impact device 104 and vibrations caused by natural movements of the wind turbine 10 (e.g., sensor noise). In another embodiment, the sensor 102 may be disposed on the component 108 up to about 2.5 meters from the impact device 104. In some embodiments, the sensor 102 may be disposed on the at least one component 108 up to about two (2) meters from the impact device 104. In other embodiments, the sensor 102 may be disposed on the component 108 up to about 1.5 meters from the impact device 104. In various embodiments, the sensor 102 may be disposed on the component 108 up to about one (1) meter from the impact device 104. In certain embodiments, the sensor 102 may be disposed on the component 108 up to about 0.5 meters from the impact device 104. In particular embodiments, the sensor 102 may be disposed on the component 108 up to about 0.25 meters from the impact device 104. In specific embodiments, the sensor 102 may be disposed on the component 108 up to about 0.1 meters from the impact device 104.

Still referring to FIG. 5, in an embodiment, the impact device 104 may be mounted in a bracket 124 (e.g., the housing 110 of the impact device 104 may be mounted in the bracket). Thus, as shown, the bracket 124 may couple the impact device 104 to the one or more components 108, and the bracket 124 may space the impact device 104 apart from the one or more components 108, such that the impact device 104 may selectively strike the one or more components 108 by actuating the piston rod 112. In further embodiments, the bracket 124 may be removably couplable to the one or more components 108 of the wind turbine 10. For example, the bracket 124 may have one or more magnets embedded therein to removably couple the bracket 124 to the one or more components 108 (e.g., via a magnetic connection). The magnetic connection may advantageously prevent cracks from propagating at the location of the bracket 124.

Figure 6:
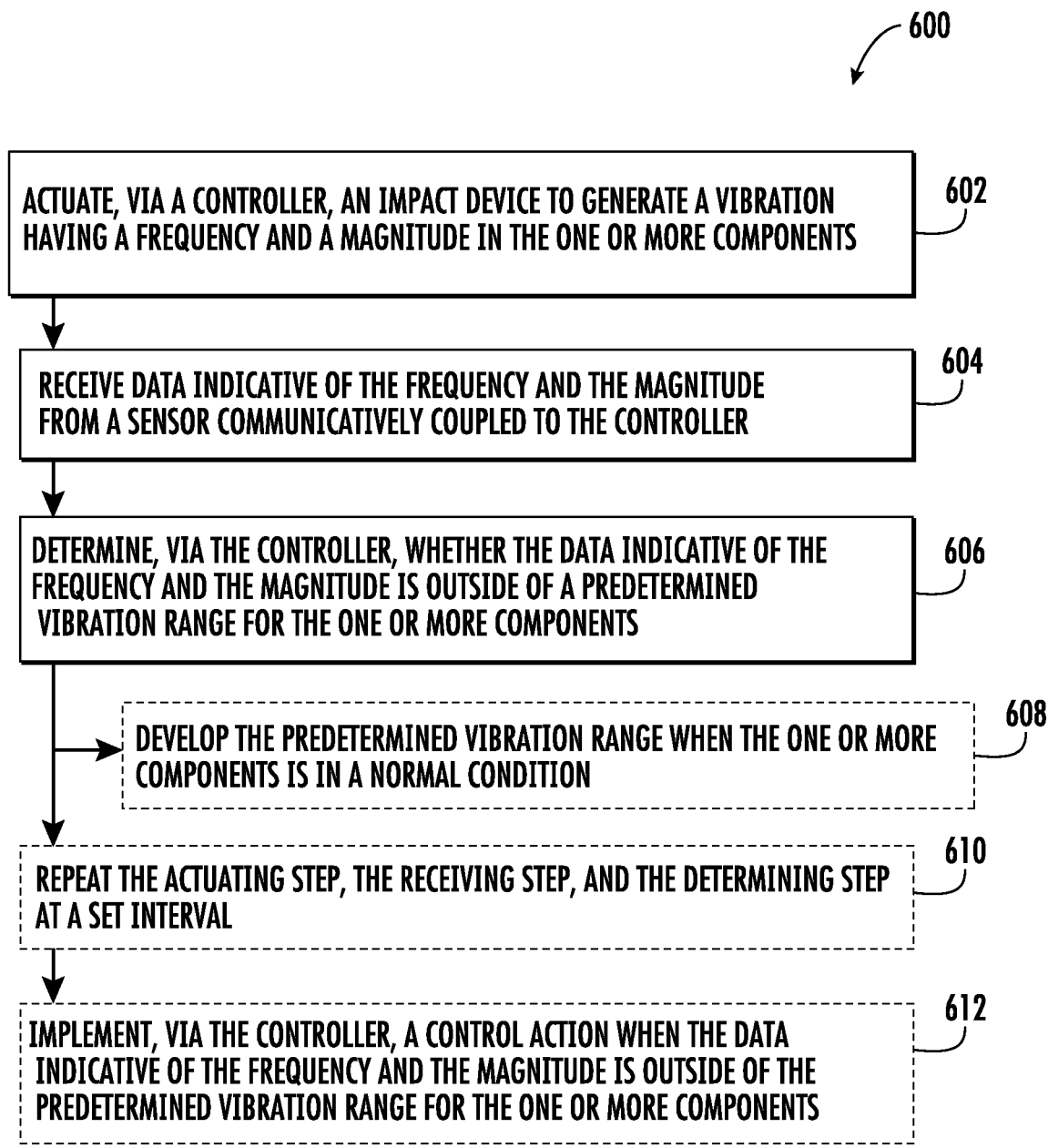
FIG. 6 illustrates a flow chart of a method for detecting a failure condition in one or more components of a wind turbine in accordance with embodiments of the present disclosure.

Referring now to FIG. 6, a flow diagram of one embodiment of a method 600 for detecting a failure condition in one or more components of a wind turbine is illustrated in accordance with aspects of the present subject matter. In general, the method 600 will be described herein with reference to the wind turbine 10 and the system 100 described above with reference to FIGS. 1 through 5. However, it will be appreciated by those of ordinary skill in the art that the disclosed method 600 may generally be utilized with any suitable wind turbine and/or may be utilized in connection with a system having any other suitable system configuration. In addition, although FIG. 6 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

As shown at (602), the method 600 includes actuating, via a controller 106, an impact device 104 to strike the one or more components and generate a vibration having a vibration frequency and a vibration magnitude in the one or more components. For example, the impact device 104 may be actuated in intervals (and the vibration data subsequently collected to monitor the stiffness of the one or more components). Particularly, the impact device 104 may be actuated once per day, or once per hour, or once per minute, or once per second, etc. in order to continuously induce vibrations in the component allowing the sensor 102 to monitor the stiffness of the component. Actuating the impact device 104 may further include sending a signal from a controller 106 that causes a piston rod to travel linearly and strike (or impact) the component to which the impact device 104 is attached. The strike from the piston rod may cause vibrations in the component having a vibration frequency and a vibration magnitude. The vibration frequency and vibration magnitude may be within a predetermined vibration range if the component is in normal operating condition (i.e., the component does not have any cracks, voids, or other material failures). In contrast, the vibration frequency and vibration magnitude may be outside of the predetermined vibration range if the component is in a failure condition (i.e., the component as one or more cracks, voids, or other material failures).

As shown at (604), the method 600 includes receiving data indicative of the vibration frequency and the vibration magnitude from a sensor 102 communicatively coupled to the controller 106. Receiving data may further include monitoring (e.g., continuously monitoring) with the controller 106 the vibration frequency and vibration magnitude of the one or more components to which the sensor 102 (and the impact device 104) is attached. As described above, the sensor 102 may be in communication with the controller 106 and may be any suitable sensor 102 capable of capturing data indicative of a vibrations of the component to which the sensor 102 is attached. For example, in some embodiments, the sensor 102 may be an accelerometer that measures changes in the acceleration of the component, thereby allowing the controller 106 to determine (e.g., calculate) the vibration frequency and the vibration magnitude of the vibrations caused by the impact device 104.

As shown at (606), the method 600 may further include determining, via the controller 106, whether the data indicative of the vibration frequency and/or the vibration magnitude is outside of a predetermined vibration range for the one or more components. For example, the predetermined vibration range may have a minimum vibration frequency threshold and a maximum vibration frequency threshold, and the controller 106 may determine (at least partially based on vibration data received from the sensor 102) when the vibration of the component exceeds the maximum vibration frequency threshold or falls below the minimum vibration frequency threshold. Similarly, the predetermined vibration range may have a minimum vibration magnitude threshold and a maximum vibration magnitude threshold, and the controller 106 may determine (at least partially based on vibration data received from the sensor 102) when the vibration of the component exceeds the maximum vibration magnitude threshold or falls below the minimum vibration magnitude threshold. In some embodiments, the predetermined vibration range may only include a maximum vibration frequency/magnitude threshold, such that the minimum vibration frequency/magnitude threshold is zero. In such embodiments, the controller 106 may determine (at least partially based on vibration data received from the sensor 102) when the vibration of the component exceeds the maximum vibration frequency/magnitude threshold.

The controller may have the predetermined vibration range stored in its memory (e.g., such as in a range of expected values, a lookup table, or other). The predetermined vibration range may be at least partially based on operating conditions or environmental conditions of the wind turbine. For example, when the wind turbine is operating, the range of expected values (i.e., baseline) in the predetermined vibration range may be larger (e.g., the maximum value and the minimum value are further apart) than when the wind turbine is not operating (such as 20% larger, or such as 15% larger, or such as 10% larger, or such as 5% larger, or such as 1-2% larger), in order to account for operational vibrations (e.g., sensor noise) experienced by the component. Similarly, when the wind turbine is exposed to various environmental conditions (such as strong winds, rain, hail, or other conditions), the predetermined vibration range may be larger (e.g., the maximum value and the minimum value are further apart) than when the wind turbine is not exposed to such environmental conditions (such as 20% larger, or such as 15% larger, or such as 10% larger, or such as 5% larger, or such as 1-2% larger), in order to account for environmental vibrations (e.g., sensor noise) experienced by the component. Particularly, the maximum value in the predetermined vibration range may be calculated (or selected from a lookup table stored in the memory) based on operating/environmental conditions of the wind turbine. The maximum value in the larger in such operational/environmental conditions to account for environmental/operational vibrations (e.g., sensor noise) imparted onto the component (such as 20% larger, or such as 15% larger, or such as 10% larger, or such as 5% larger, or such as 1-2% larger).

The method 600 may further include detecting a failure condition (change in stiffness indicative of a failure condition) in the component to which the sensor 102 and the impact device 104 are attached. The failure condition may be a crack, fracture, separation, or other failure of the material from which the component is composed, and on which the sensor 102 and the impact device 104 are disposed. The system 100 may detect a failure condition when the controller 106 determines that the data indicative of the vibration frequency and the vibration magnitude is outside of a predetermined vibration range for the one or more components.

Still referring to FIG. 6, as shown at (608), the method may include an optional step (as indicate by the dashed box) of developing the predetermined vibration range when the one or more components is in a normal condition (i.e., not in a failure condition). Particularly, developing, e.g., with the controller 106, the predetermined vibration range may by collecting vibration data when the one or more components is in a normal condition. A normal condition may be when the one or more components does not have any cracks, separations, breaks, or other failures. Additionally, or alternatively, the normal condition may be during operation of the wind turbine, non-operation (or shut off) of the wind turbine (such that the rotor blades are not rotating).

Developing at (608) may include actuating the impact device 104 to generate a normal vibration having a normal vibration frequency and a normal vibration magnitude in the one or more components. As used herein, "normal" in the context of vibration frequency and vibration magnitude, means that the vibration is indicative that the component is not in a failure condition (e.g., the component does not have any cracks, breaks, or separations). Developing at (608) may further include receiving, via the sensor 102, normal data indicative of the normal vibration frequency and the normal vibration magnitude. In some embodiments, the controller may have the normal vibration frequency and normal vibration magnitude stored in its memory (e.g., such as in a range of expected values, a lookup table, or other). The normal vibration frequency and normal vibration magnitude may be at least partially based on operating conditions of the wind turbine. For example, when the wind turbine is operating, the range of expected values (i.e., baseline) normal vibration frequency and normal vibration magnitude may be larger than when the wind turbine is not operating, in order to account for operational/environmental vibrations (e.g., sensor noise) experienced by the wind turbine.

In still another embodiment, developing at (608) may include storing the normal data (e.g., in the memory device 116 described above). In exemplary implementations, the controller 106 may establish, develop, and/or build a historical normal vibration data when the component is in a normal condition, such that when the component is in a failure condition, the controller 106 may determine (e.g., by comparison with the historical normal vibration data) that the vibrations sensed by the sensor 102 are outside of the historical normal vibration data range. The controller 106 may develop, build, or establish a maximum vibration frequency threshold, a maximum vibration magnitude threshold, a minimum vibration frequency threshold, and a minimum vibration magnitude threshold by repeating the actuating, receiving, and storing steps in order to develop a predetermined vibration range. Alternatively, or additionally, the controller 106 may be pre-programmed with the predetermined vibration range stored in the memory.

In many embodiments, the method 600 may further include, as shown at (610), repeating (602), (604), and (606) at a set interval. In other words, the method 600 may further include repeating the actuating step (602), the receiving step (604), and the determining step (606) at a set interval. The set interval may be a time interval or period, such as once every day (e.g., 24 hours), once every hour, once every, minute, once every second, or other time intervals. In various embodiments, the actuating step (602), the receiving step (604), and the determining step (606) may be repeated until it is determined that the component is in a failure condition (i.e., that the vibration frequency and/or vibration magnitude is determined by the controller 106 to be outside of the predetermined vibration range).

As shown at (612), the method 600 may further include implementing a control action when the data indicative of the vibration frequency and the vibration magnitude is determined to be outside of the predetermined vibration range for the one or more components. In other words, when the controller 106 determines the data indicative of the vibration frequency and the vibration magnitude is indicative of a failure condition (e.g., crack) or indicative that a failure condition is likely to occur, the controller 106 may alter the operation of the wind turbine. The control action performed by the controller 106 can take many forms. For example, in one embodiment, the control action may include shutting down the wind turbine 10. In another embodiment, the control action may include altering the blade pitch of one or more rotor blades 20. As indicated above, this may be accomplished by controlling one or more of the pitch adjustment mechanisms 72. Alternatively, the control action may include yawing the nacelle 14 to change the angle of the nacelle 14 relative to the direction of the wind. More specifically, the yaw drive mechanism 56 may be used to change the angle of the nacelle 14 so as to protect various external wind turbine components, such as the transformer, stairs, etc.

The controller 106 may also be configured to generate a notification signal when the controller 106 determines that a failure condition (e.g., a crack) has occurred in the one or more wind turbine components. Thus, as shown in FIG. 5, as an example, the controller 106 may be configured to send the notification signal to a user, e.g., via a user interface 126, if a failure condition is detected. More specifically, in embodiments, having a system 100 attached to multiple different wind turbine components, the notification signal may include a description of which wind turbine component is experiencing a crack or failure and/or vibration behavior indicative of a crack or failure.

Further aspects of the invention are provided by the subject matter of the following clauses:

Clause 1. A system for detecting a failure condition in one or more components of a wind turbine, the system comprising:
an impact device disposed on one of the one or more components and configured to selectively generate an impulse in or on the one or more components;
at least one sensor disposed on one of the one or more components and configured to provide data indicative of vibrations in the one or more components; and
at least one controller communicatively coupled to the impact device and the at least one sensor, the at least one controller comprising at least one processor, the at least one processor configured to perform a plurality of operations, the plurality of operations comprising:
actuating the impact device to generate a vibration having a frequency and a magnitude in the one or more components;
receiving, via the at least one sensor, data indicative of the frequency and the magnitude; and
determining whether the data indicative of the frequency and/or the magnitude is outside of a predetermined vibration range for the one or more components.

Clause 2. The system of claim 1, wherein the plurality of operations further comprises developing the predetermined vibration range when the one or more components is in a normal condition.

Clause 3. The system of claim 2, wherein developing the predetermined vibration range comprises:
actuating the impact device to generate a normal vibration having a normal vibration frequency and a normal vibration magnitude in the one or more components;
receiving, via the sensor, normal data indicative of the normal vibration frequency and the normal vibration magnitude; and
storing the normal data.

Clause 4. The system of claim 1, wherein the plurality of operations further comprises implementing a control action when the data indicative of the vibration frequency and the vibration magnitude is determined to be outside of the predetermined vibration range for the one or more components.

Clause 5. The system of claim 1, wherein the plurality of operations further comprises repeating the actuating step, the receiving step, and the determining step at a set interval.

Clause 6. The system of claim 1, wherein the one or more components comprises a hub and a pitch bearing of the wind turbine.

Clause 7. The system of claim 1, wherein the one or more components comprises a rotor blade.

Clause 8. The system of claim 1, wherein the sensor is one of an accelerometer, a strain gauge, an eddy-current sensor, a laser displacement sensor, a gyroscope, or an acoustic pressure sensor.

Clause 9. The system of claim 1, wherein the sensor is disposed on the one or more components up to about 2.5 meters from the impact device.

Clause 10. The system of claim 1, wherein the impact device is mounted in a bracket, and wherein the bracket is removably couplable to the one or more components.

Clause 11. A method for detecting a failure condition in one or more components of a wind turbine, the method comprising:
actuating, via a controller, an impact device to generate a vibration having a frequency and a magnitude in the one or more components;
receiving data indicative of the frequency and the magnitude from a sensor communicatively coupled to the controller;
determining, via the controller, whether the data indicative of the frequency and/or the magnitude is outside of a predetermined vibration range for the one or more components; and
implementing, via the controller, a control action when the data indicative of the frequency and the magnitude is outside of the predetermined vibration range for the one or more components.

Clause 12. The method of claim 11, further comprising developing the predetermined vibration range when the one or more components is in a normal condition.

Clause 13. The method of claim 12, wherein developing the predetermined vibration range comprises:
actuating the impact device to generate a normal vibration having a normal vibration frequency and a normal vibration magnitude in the one or more components;
receiving, via the sensor, normal data indicative of the normal vibration frequency and the normal vibration magnitude; and
storing the normal data.

Clause 14. The method of claim 11, wherein implementing the control action when the data indicative of the frequency and the magnitude is determined to be outside of the predetermined vibration range for the one or more components further comprises shutting down the wind turbine.

Clause 15. The method of claim 11, further comprising repeating the actuating step, the receiving step, and the determining step at a set interval.

Clause 16. The method of claim 11, wherein the one or more components comprises a hub and a pitch bearing of the wind turbine.

Clause 17. The method of claim 11, wherein the one or more components comprises a rotor blade.

Clause 18. The method of claim 11, wherein the sensor is one of an accelerometer, a strain gauge, an eddy-current sensor, a laser displacement sensor, a gyroscope, or an acoustic pressure sensor.

Clause 19. The method of claim 11, further comprising positioning the on the one or more components up to about 2.5 meters from the impact device.

Clause 20. The method of claim 11, wherein the impact device is mounted in a bracket, and wherein the method further comprises removably coupling the bracket to the one or more components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting a failure condition in one or more components of a wind turbine, the one or more components comprising a first component and a second component that is different than the first component, the system comprising:
   an impact device disposed on the first component of the one of the one or more components and configured to selectively generate an impulse in or on the one or more components, wherein the impact device is mounted in a bracket, and wherein the bracket is removably couplable to the first component of the one or more components via a magnetic connection;
   at least one sensor disposed on the second component of the one of the one or more components and configured to provide data indicative of vibrations in the second component of the one or more components; and
   at least one controller communicatively coupled to the impact device and the at least one sensor, the at least one controller comprising at least one processor, the at least one processor configured to perform a plurality of operations, the plurality of operations comprising:
   actuating the impact device to generate a vibration having a frequency and a magnitude in the one or more components;
   receiving, via the at least one sensor, data indicative of the frequency and the magnitude; and
   determining whether the data indicative of the frequency and/or the magnitude is outside of a predetermined vibration range for the one or more components;
   wherein the one or more components comprises a hub and a pitch bearing coupled to the hub, wherein at least one of the impact device and the sensor are disposed on an interior surface of the hub, and wherein the other of the impact device and the sensor are disposed on the pitch bearing.

2. The system of claim 1, wherein the plurality of operations further comprises developing the predetermined vibration range when the one or more components is in a normal condition.

3. The system of claim 2, wherein developing the predetermined vibration range comprises:
   actuating the impact device to generate a normal vibration having a normal vibration frequency and a normal vibration magnitude in the one or more components;
   receiving, via the sensor, normal data indicative of the normal vibration frequency and the normal vibration magnitude; and
   storing the normal data.

4. The system of claim 1, wherein the plurality of operations further comprises implementing a control action when the data indicative of the vibration frequency and the vibration magnitude is determined to be outside of the predetermined vibration range for the one or more components.

5. The system of claim 1, wherein the plurality of operations further comprises repeating the actuating step, the receiving step, and the determining step at a set interval.

6. The system of claim 1, wherein the sensor is one of an accelerometer, a strain gauge, an eddy-current sensor, a laser displacement sensor, a gyroscope, or an acoustic pressure sensor.

7. The system of claim 1, wherein the sensor is disposed on the one or more components up to 0.5 meters from the impact device.

8. The system of claim 1, wherein the impact device is configured to cause the vibration in both the hub and the pitch bearing by striking one of the hub or the pitch bearing, and wherein the sensor is configured to receive data indicative of the frequency and the magnitude of the vibration in the other of the hub or the pitch bearing.

9. A method for detecting a failure condition in one or more components of a wind turbine, the one or more components comprising a first component and a second component that is different than the first component, the method comprising:
   actuating, via a controller, an impact device disposed on the first component of the one or more components to generate a vibration having a frequency and a magnitude in the one or more components, wherein the impact device is mounted in a bracket, and wherein the bracket is removably couplable to the first component of the one or more components via a magnetic connection;
   receiving data indicative of the frequency and the magnitude from a sensor disposed on the second component of the one or more components and communicatively coupled to the controller;
   determining, via the controller, whether the data indicative of the frequency and/or the magnitude is outside of a predetermined vibration range for the one or more components; and
   implementing, via the controller, a control action when the data indicative of the frequency and the magnitude is outside of the predetermined vibration range for the one or more components;
   wherein the one or more components comprises a hub and a pitch bearing coupled to the hub, wherein at least one of the impact device and the sensor are disposed on an interior surface of the hub, and wherein the other of the impact device and the sensor are disposed on the pitch bearing.

10. The method of claim 9, further comprising developing the predetermined vibration range when the one or more components is in a normal condition.

11. The method of claim 10, wherein developing the predetermined vibration range comprises:
   actuating the impact device to generate a normal vibration having a normal vibration frequency and a normal vibration magnitude in the one or more components;
   receiving, via the sensor, normal data indicative of the normal vibration frequency and the normal vibration magnitude; and
   storing the normal data.

12. The method of claim 9, wherein implementing the control action when the data indicative of the frequency and the magnitude is determined to be outside of the predetermined vibration range for the one or more components comprises shutting down the wind turbine.

13. The method of claim 9, further comprising repeating the actuating step, the receiving step, and the determining step at a set interval.

14. The method of claim 9, wherein the sensor is one of an accelerometer, a strain gauge, an eddy-current sensor, a laser displacement sensor, a gyroscope, or an acoustic pressure sensor.

15. The method of claim 9, further comprising positioning the sensor on the one or more components up to 0.5 meters from the impact device.

* * * * *